United States Patent Office 2,905,687
Patented Sept. 22, 1959

---

2,905,687

PROCESS FOR THE PREPARATION OF 3α-ACYLOXY-6β-HYDROXY-TROPANES

Gábor Fodor, Irén W. Vincze, József Tóth, Géza Janzsó, and Kornélia Láng, all of Szeged, Hungary, assignors to Egyesult Gyogyszer-es Tapszergyar, Budapest, Hungary No Drawing. Application March 25, 1958
Serial No. 723,631

Claims priority, application Hungary April 1, 1957

8 Claims. (Cl. 260—292)

This invention is concerned with a process for the preparation of 3α-acyloxy-6β-hydroxy-tropanes. These monoacyl derivatives of tropanes are important intermediate compounds for the preparation of 6-tropene-3α-ol and through this compound for the preparation of 6,7β-epoxy-3α-hydroxy-tropane and 6,7β-epoxy-3α-acyloxy-tropane.

Up to the present it has not been possible to prepare the 3α-acyloxy-6β-hydroxy-tropanes from 3α.6β-dihydroxy-tropane neither by selective acylation of this compound, nor by the partial deacylation of their diacyl derivatives. (Stoll et al., Helv. Chim. Acta 36, 1506, and following, 1953.)

It has been found that 3α-acyloxy-6β-hydroxy-tropane may be prepared by partial hydrolysis of the 3α.6β-diacyloxy-tropane with dilute aqueous alkali hydroxyde in presence of a watersoluble organic solvent having no hydroxyl group.

It is a further object of the invention to prepare new racemic 3α-isovaleroxy-6β-tropane and l-3α-tropoyloxy-6β-hydroxy-tropane.

As hydroxyl-free solvents tetrahydrofurane, dioxane, dimethyl-formamide, but with a special advantage acetone can be used. An optimal yield of the mono-acyl compound can be obtained at temperatures between 25 and 30° centigrade. One can employ advantageously alkali hydroxide in a quantity between an amount calculated for the saponification of one acyl radical and for the twofold of the same. In this way the 3α-acyloxy-6-hydroxy-tropane can be obtained with a good yield, along with an unchanged diacyl-tropane and smaller amounts of 3α.6β-dihydroxy-tropane. In this way from the 3α.6β-diacetoxy-tropane the 3α-acetoxy-6β-hydroxy-tropane and from the di-isovaleroxy-tropane the 3α-isovaleroxy-6β-hydroxy-tropane can be obtained. In a similar way di-l-tropic acid ester of the l-3α.6β-dihydroxy-tropane the l-3α-tropoyl-6β-hydroxy-tropane can be obtained. This last compound has a mydriatic effect. This partial deacylation could not be expected in view of the prior art.

*Example 1*

24 g. 3α.6β-diacetoxytropane are dissolved in 700 ml. acetone and 1700 ml. n/10 NaOH are added to the solution. This solution is heated for 65 minutes to 30 centigrades, then neutralized with about 120 ml. n HCl. The reaction mixture is evaporated to dryness in vacuo, the residue dissolved in 200 ml. water, its pH adjusted with calciumcarbonate to 10, and the base extracted six times with 100 ml. chloroform each. The chloroform extraction is dried on sodiumsulphate and the chloroform distilled off in waterbath. In this way a viscous oil is obtained, which becomes crystalline when triturated with ice-cooled ether. Yield: 15.6 g. (78%) pure 3α-acetoxy-6β-hydroxytropane. M.P. 117–118 centigrades. 3.82 g.

3α.6β-diacetoxy-tropane can be recovered from the ethereal mother liquor.

*Example 2*

6.5 g. racemic 3α.6β-diisovaleroxytropane-hydrobromide is dissolved in a mixture of 710 ml. n/10 NaOH and 200 ml. acetone. This mixture is allowed to stand at room temperature for 6 hours, then neutralized with diluted HCl and the solvent distilled off below 50 centigrades. The residue is dissolved in 40 ml. water, the mixture adjusted with calcium carbonate to pH 10 and hereafter extracted ten times with 50 ml. chloroform each. The combined chloroform extracts are dried over $Na_2SO_4$ and the chloroform is driven off. 2.5 g. racemic 3α.6β-dihydroxytropane-3-mono-isovalerate is obtained. This compound can be dissolved in anhydrous alcohol, and converted with hydrochloric acid into its hydrochloride salt, the M.P. of which is 180 centigrades. This compound is identical with the racemic valeroidine hydrochloride prepared in a different way.

*Analysis.*—Calculated: C=56.25, H=8.65. Found: C=56.22, H=8.90.

*Example 3*

According to the process described in Example 2 the l-3α-tropoyl-3α.6β-dihydroxytropane (hydrobromid, M.P. 148 centigrades, $[\alpha]_D^{20} +$ −30° in water) can be obtained from the di-l-tropic acid ester of the l-3α.6β-dihydroxytropane.

What we claim is:

1. A process for the preparation of a 3α-acyloxy-6β-hydroxy-tropane comprising partially saponifying a 3α.6β-di-acyloxy-tropane selected from the group consisting of 3α.6β-diacetoxy-tropane, 3α.6β-diisovaleroxy-tropane, and the di-l-tropic acid ester of the l-3α.6β-dihydroxy-tropane by means of diluted aqueous alkalihydroxide solution, in presence of a water-soluble organic solvent containing no hydroxy groups selected from the group consisting of tetrahydrofurane, dioxane, dimethyl-formamide, and acetone.

2. A process according to claim 1, in which the quantity of the alkalihydroxide employed for the partial saponification lies between the amount calculated for the saponification of one acyl radical and the twofold of the same.

3. A process for the preparation of a 3α-acyloxy-6β-hydroxy-tropane according to claim 1, in which the saponification is effected between 25 and 30° centigrade.

4. A process for the preparation of a 3α-acyloxy-6β-hydroxy-tropane according to claim 1, in which acetone is employed as a hydroxyl-free organic solvent.

5. A process for the preparation of 3α-acetoxy-6β-hydroxy-tropane, in which the 3α.6β-diacetoxy-tropane is partially saponified by means of diluted aqueous alkali hydroxide solution, in presence of a water soluble hydroxy-free organic solvent selected from the group consisting of tetrahydrofurane, dioxane, dimethyl-formamide, and acetone.

6. A process for the preparation of 3α-isovaleroxy-6β-hydroxy-tropane in which the 3α.6β-diisovaleroxy-tropane is partially saponified by means of diluted aqueous alkali hydroxide solution in presence of a water soluble hydroxy-free organic solvent selected from the group consisting of tetrahydrofurane, dioxane, dimethyl-formamide, and acetone.

7. A process for the preparation of l-3α-tropoyloxy-6β-hydroxy-tropane in which l-di-tropoyl-3α.6β-dihydroxy-tropane is partially saponified by means of diluted aqueous alkali-hydroxyde solution, in presence of a water-soluble, hydroxy-free, organic solvent selected from the group consisting of tetrahydrofurane, dioxane, dimethylformamide, and acetone.

8. The 1-3α-tropoyloxy-6β-hydroxy-tropane.

References Cited in the file of this patent

Stoll et al.: Helv. Chim. Acta, vol. 35, pp. 1263–69 (1952).

Stoll et al.: Helv. Chim. Acta, vol. 36, pp. 1506–11 (1953).